US007577786B2

(12) United States Patent
Matlock, Jr.

(10) Patent No.: US 7,577,786 B2
(45) Date of Patent: Aug. 18, 2009

(54) RESTORE ACCELERATOR FOR SERIAL MEDIA BACKUP SYSTEMS

(75) Inventor: Clarence B. Matlock, Jr., Bath, PA (US)

(73) Assignee: Quality Systems Associates, Inc., Doylestown, PA (US)

( * ) Notice: Subject to any disclaimer, the term of this patent is extended or adjusted under 35 U.S.C. 154(b) by 197 days.

(21) Appl. No.: 11/296,904

(22) Filed: Dec. 8, 2005

(65) Prior Publication Data
US 2007/0136540 A1    Jun. 14, 2007

(51) Int. Cl.
*G06F 12/16* (2006.01)
*G06F 13/00* (2006.01)

(52) U.S. Cl. .......................... 711/111; 711/4; 711/161; 711/162; 707/204; 714/6; 714/769; 714/771; 360/72.1; 360/74.1

(58) Field of Classification Search ........................ None
See application file for complete search history.

(56) References Cited

U.S. PATENT DOCUMENTS

| 5,485,606 | A  | * | 1/1996  | Midgdey et al. | ............... | 707/10 |
| 6,343,342 | B1 | * | 1/2002  | Carlson | ....................... | 711/112 |
| 6,938,180 | B1 | * | 8/2005  | Dysert et al. | ................... | 714/6 |
| 2001/0034811 | A1 | * | 10/2001 | Basham et al. | ............... | 711/111 |
| 2003/0065882 | A1 | * | 4/2003  | Beeston et al. | ............... | 711/111 |
| 2004/0162939 | A1 | * | 8/2004  | Bartlett | ....................... | 711/111 |
| 2005/0165820 | A1 | * | 7/2005  | Pudipeddi et al. | ........... | 707/101 |
| 2005/0204108 | A1 | * | 9/2005  | Ofek et al. | ................... | 711/162 |
| 2005/0246510 | A1 | * | 11/2005 | Retnamma et al. | .......... | 711/162 |

OTHER PUBLICATIONS

Microsoft Tape Format Specification Version 1.00a (published Sep. 15, 2000), pp. 13-21.*
"*Guardian Disk and Tape Utilities Reference Manual*"; Product Version Utilities G06; Hewlett-Packard Company Part No. 523325-010; Published, May 2008.
http://www.docs.hp.com/en/NSGSeries.html, Printed Jan. 29, 2009.

* cited by examiner

*Primary Examiner*—Hyung S Sough
*Assistant Examiner*—Kaushikkumar Patel
(74) *Attorney, Agent, or Firm*—RatnerPrestia (57) ABSTRACT

A method for accelerating a tape backup system restore process receives a list of files that are to be restored and searches a tape catalogue to find tape volume and file sequence numbers for each file in the list of files, where the catalogue is an alphabetical listing of the contents of one or more backup tape volumes. The process appends the tape volume and file sequence numbers for each of the files to the list of files and then sorts the list of files according to tape volume and file sequence number. Accordingly, a list is obtained including the files that are to be restored, ordered according to the location of the files on the backup tape volumes. The restore process is accelerated by restoring files sequentially from this list and skipping over any intermediate files that are not on the list.

23 Claims, 6 Drawing Sheets

RESTORE ACCELERATOR FOR SERIAL MEDIA BACKUP SYSTEMS

TECHNICAL FIELD

The present invention relates generally to data retrieval from backup tape volume systems and, more particularly, to a system for accelerating file retrieval from backup tapes used in an HP Nonstop™ system.

BACKGROUND OF THE INVENTION

Tape storage has become the preferred method of backing up information on computers due to its relatively low cost, high capacity, durability, and portability. In data storage and recovery systems, therefore, computer files stored on one or more main drives are recreated and stored onto one or more backup tape volumes (i.e., a backup tape volume set). Known backup schemes offer relatively good protection for client data, but with a very high administration overhead. If data needs to be recovered by a client, for example, as a result of one or more files being lost or destroyed, then the client typically needs to contact an administrator of the backup system and request a restore procedure. Typically, a restore procedure involves the backup system administrator tracking down and mounting a specific tape or tape set, on which the last backup of the lost file(s) was made, and initiating the restore procedure.

The restore procedure may include running a restore program that searches through the one or more backup tape volumes in the tape set in order to locate files that are to be restored. However, since a tape volume is a sequential access medium, it may take an undesirably long period of time to access a particular file as every file on the tape, prior to the desired file, must be examined. While such a procedure is typically very reliable, it may be generally onerous on client users and backup system administrators.

SUMMARY OF THE INVENTION

The present invention is embodied in a method of accelerating file retrieval from a tape volume set by obtaining a list of one or more files that are to be retrieved, obtaining a location of each of the one or more files in the tape volume set, retrieving the one or more files according to their location in the tape volume set, and skipping any files not included in the list.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Due to the time delay associated with serially accessing the tape volumes of a tape set to find files that are to be restored, a backup/restore system may catalogue the contents of the backup tape volume to form a serial listing of all the files stored on the multiple volumes that make up a particular backup tape set. The list includes the location of each of the files, represented as a tape volume. Accordingly, the restore process may access the catalogue in order to find the tape volume for each of the files that are to be restored and access them according to their respective tape volumes, as opposed to searching through each volume of the backup tape set. The restore process still has to serially search through every file in the volume to find the desired files.

The present invention presents a method for accelerating the restore process for a tape backup/restore system such as the Hewlett Packard® (HP) Nonstop System, for example. One embodiment of the present invention is a Restore Accelerator for HP Nonstop Systems that works in conjunction with the Backup/Restore products for HP Nonstop Systems. The Restore Accelerator is a program that navigates the contents of a tape generated by the Backup program and feeds data to the Restore program, which recreates the disk files that are stored on the tape. By implementing Restore Accelerator, the amount of time required to retrieve files from an HP Nonstop backup tape may be reduced by 80-90%, for example, depending on the speed of the tape device and the contents of the backup tape.

One reason for this improvement in file retrieval speed in the HP Nonstop system is because the Restore program, operating without Accelerator, has limited knowledge on the contents of the backup tape volume. Restore may only know, for example, that each file on the backup tape is stored in alphabetical sequence according to filename. Accordingly, the Restore program causes the appropriate backup tape volume to be mounted and sequentially positions to each file on the tape in order to determine whether a given file is to be restored to the disk; as described above, this results in undesirable delays in file retrieval. In addressing this problem, the Restore Accelerator gathers information about the contents of the tape volume set (i.e., including one or more backup tape volumes) so that it may skip over irrelevant files and send only the relevant data to the Restore program for file restoration.

Backup data in one embodiment of the invention may be laid out on the tape drive in a format shown below in Table 1, for example.

TABLE 1

Exemplary layout of backup data on a tape drive.

BOT (beginning of tape)
Tape Header Record 1
Tape Header Record 2
EOF (end of file)
Tape Header Record 1

TABLE 1-continued

Exemplary layout of backup data on a tape drive.

Tape Header Record 2
EOF
File Header Record
File Data Record
File Data Record
File Data Record
. . .
EOF
File Header Record
File Data Record
File Data Record
File Data Record
. . .
EOF
. . .
. . .
. . .
File Header Record
File Data Record
File Data Record
File Data Record
. . .
EOF
Tape Trailer Record
EOT (end of tape)

In such an embodiment, the Restore Accelerator does not replicate the structure of the backup data on the tape drive. Rather, Restore Accelerator passes over a defined number of backed up files and modifies the data within the blocks so that the HP Nonstop Restore program accepts it as the actual tape contents. Accordingly, the Restore Accelerator (RA) is "opened" by the HP Restore program as a tape drive (i.e., the RA is a virtual tape drive). The RA, therefore, mimics the actions of the Restore program. In an exemplary "Tape Open" operation, the Restore program may "open" RA as a tape drive. RA may then issue an open command to the actual, physical tape drive. Once RA's open of the physical tape drive completes, it completes the open from Restore. In an exemplary "Data Transfer" operation, the Restore program may issue a "read" to RA. RA may then issue a read command to the actual, physical tape drive. The Restore program waits until RA's read completes. If the read produces a file header record, commands are issued from RA to forward the physical tape drive until the desired location is reached. Then, the next record on the tape is read. Accordingly, RA forwards either the data or an error code to the Restore process after it has adjusted the file sequence number and recalculated the checksum of the backup data at the desired location.

The Restore Accelerator makes decisions on whether to skip records in the physical tape drive only when a file header record is received. Accordingly, only file header records and their associated data records may be skipped and RA sends all tape header and trailer records to the Restore program as they occur. Nevertheless, RA may alter the sequence numbers of file and tape header and trailer records, if necessary, in order to keep the Restore program from aborting.

In a further embodiment, the Restore Accelerator may act in a startup phase and a tape-process phase. In the startup phase, the Restore Accelerator parses a parameter string obtained either from a command file or in the command line in order to acquire the file sets that are to be restored. The Accelerator then analyzes file sets that are to be restored and gathers information about the position of each file within the one or more tape volumes comprising the tape set. A starting point may then be assigned for each file set (i.e., tape name and sequence, and file sequence within the tape). This information may be obtained from a media management product or spooler listing. The file sets may then be sorted to put them in order of appearance within the tape set. At this point, the Restore program is initialized, whereby all required files of the Accelerator are opened and linked to corresponding files opened by the Restore program (e.g., InFile, OutFile, and HomeTerm).

The tape-process phase performs the tape positioning and transfer of data from the one or more tapes comprising the tape set to the Restore program. When the Restore program is ready to accept file data, it issues an "open" command to the tape drive. The Restore Accelerator, however, intercepts this command. Accelerator then examines the table of file sets to determine the location of the first file in the sorted list of file sets. Restore Accelerator then causes the specific tape volume where the first file set starts to be mounted. After the tape is mounted, Restore Accelerator replies to Restore indicating that the tape is ready for data transfer. Accordingly, the Restore program is led to believe that it is communicating directly with the tape volume (i.e., the Accelerator acts as a virtual tape volume). Restore then performs a series of "read" and "control" operations that allow the Restore Accelerator, acting as a virtual tape volume, to skip over irrelevant information blocks and to pass only relevant information blocks to the Restore program.

When Restore Accelerator detects a "file header" block for a file that is to be retrieved from the tape volume, it stops sending data to the Restore program and begins positioning the tape to the first "file header" block that satisfies the restore criteria (i.e., the location of the next file in the sorted list of file sets). Once the tape drive has been positioned to the next file location, Restore Accelerator continues to transmit file data to the Restore program. Restore Accelerator continues to do this until all of the files designated by the first file set have been restored through the Restore program. Those skilled in the art may recognize that this operation may span several tape volumes and, thus, several tape mount scenarios.

In a further embodiment of the invention, there may be multiple file sets that are to be restored. Accordingly, once Restore Accelerator is finished transmitting the file data corresponding to the first file set, as described above, it may retrieve the location information for the next file set. If the first file in the next file set resides on the currently mounted tape, then Restore Accelerator repositions the tape and proceeds to transmit the file data to the Restore program. If a different tape in the tape set is required, the Restore program may be halted and a new one started to begin with the new tape. This process is repeated until all the file sets are restored. Those skilled in the art may recognize that this further operation may span several tapes and several tape mount scenarios.

Figure 1:
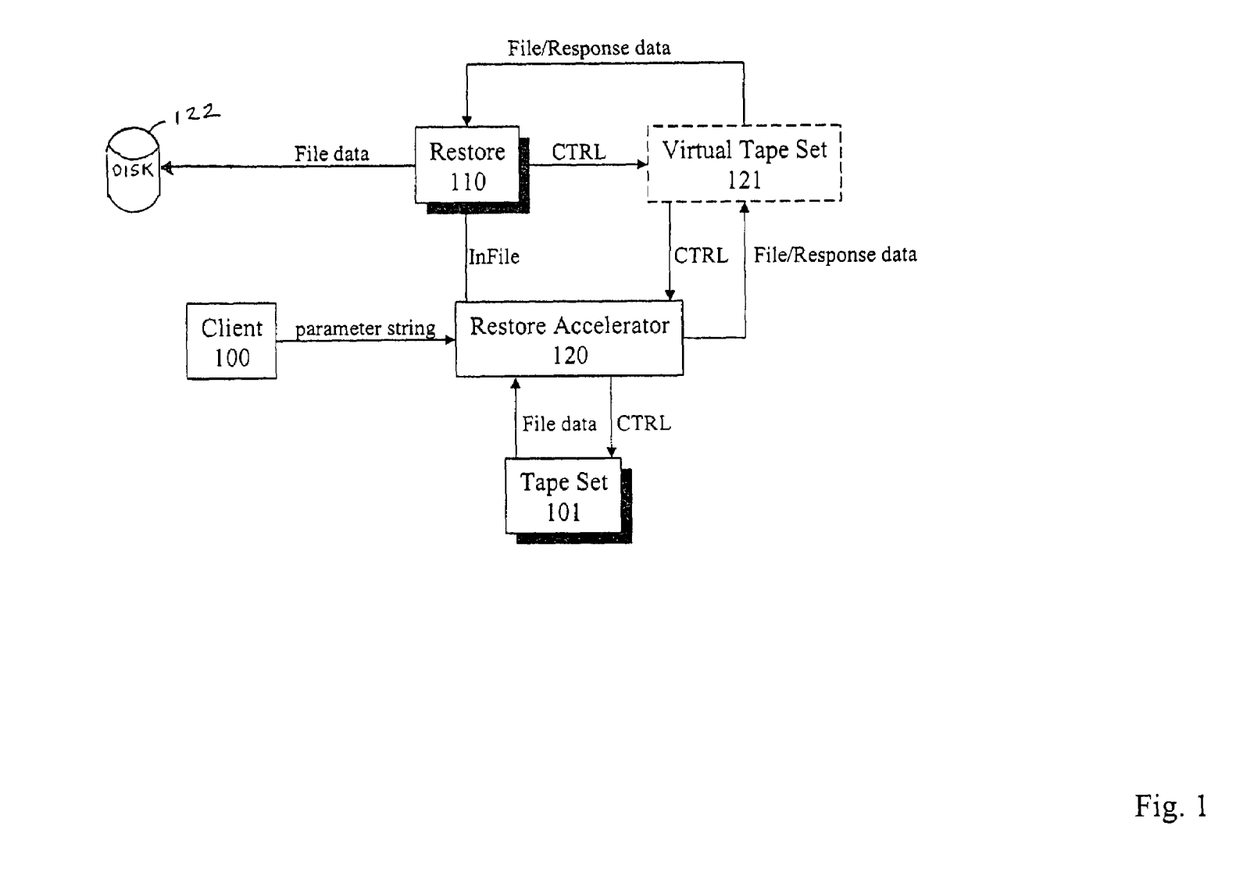
FIG. 1 is a block diagram of a data restore system, according to the present invention.

Referring now to the drawing, in which like reference numbers refer to like elements throughout the various figures that comprise the drawing, FIG. 1 is a block diagram conceptually illustrating an embodiment of the present invention. In this embodiment, client 100 transmits a parameter string containing a list of file sets that are to be retrieved from one or more backup tape volumes comprising Tape Set 101. The parameter string is received by Restore Accelerator 120, which obtains file locations and sorts the file sets list, as described above. Restore Accelerator 120 then transmits the sorted file sets list to Restore 110 as an InFile, whereby Restore 110 treats the InFile as if it were a parameter string coming from client 100. Accordingly, Restore 110 transmits control (CTRL) commands for causing a tape volume to be mounted and sequentially positioning to the files that are to be restored, according to their order in the sorted file sets list. These commands are intercepted by Restore Accelerator 120, acting as Virtual Tape Set 121. Restore Accelerator 120 then obtains the appropriate file data from Tape Set 101 by transmitting its own control (CTRL) commands to Tape Set 101. Restore Accelerator 120, acting as Virtual Tape Set 121, forwards the file data to Restore 110, which subsequently recreates the disk files on the disk 122 from the file data and headers. In addition to sending file data to Restore 110, Restore Accelerator 120, acting as Virtual Tape Set 121, may also send response data to Restore 110 such as tape drive errors, file errors and the like.

Figure 2:
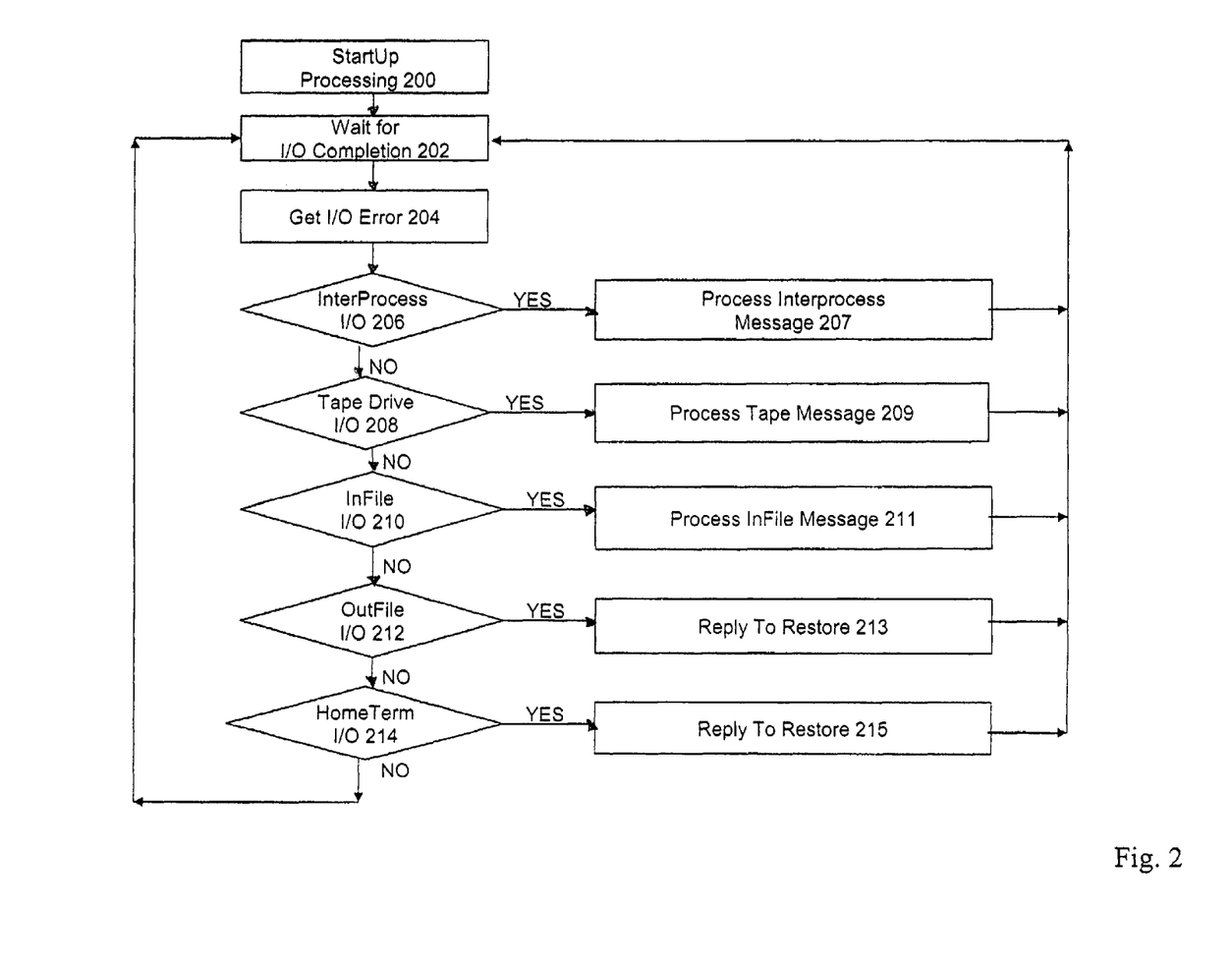
FIG. 2 is a flow diagram illustrating the flow of a QRestore process, according to the present invention.

FIG. 2 is a flow diagram illustrating a process according to one embodiment of the present invention. The process, which may be referred to as QRestore, begins by executing startup processing block 200. In step 202, QRestore waits for any currently running I/Os to complete operation, then proceeds to step 204 to get any I/O errors. Decision block 206 executes an InterProcess Message process in step 207 whenever QRestore receives a completion of an InterProcess I/O. Decision block 208 executes a Tape Message process in step 209 whenever QRestore receives a completion of a Tape Drive I/O. Decision block 210 executes an InFile Message process in step 211 whenever QRestore receives a completion of an InFile I/O. Decision block 212 replies to Restore in step 213 whenever QRestore receives a completion of an OutFile I/O. Decision block 214 replies to Restore in step 215 whenever QRestore receives a completion of a HomeTerm I/O. Whenever a process is run, step 202 waits for it to complete before proceeding to step 204 to process any I/O errors. If no known I/Os have completed, QRestore waits until an I/O completion is received.

Figure 3:
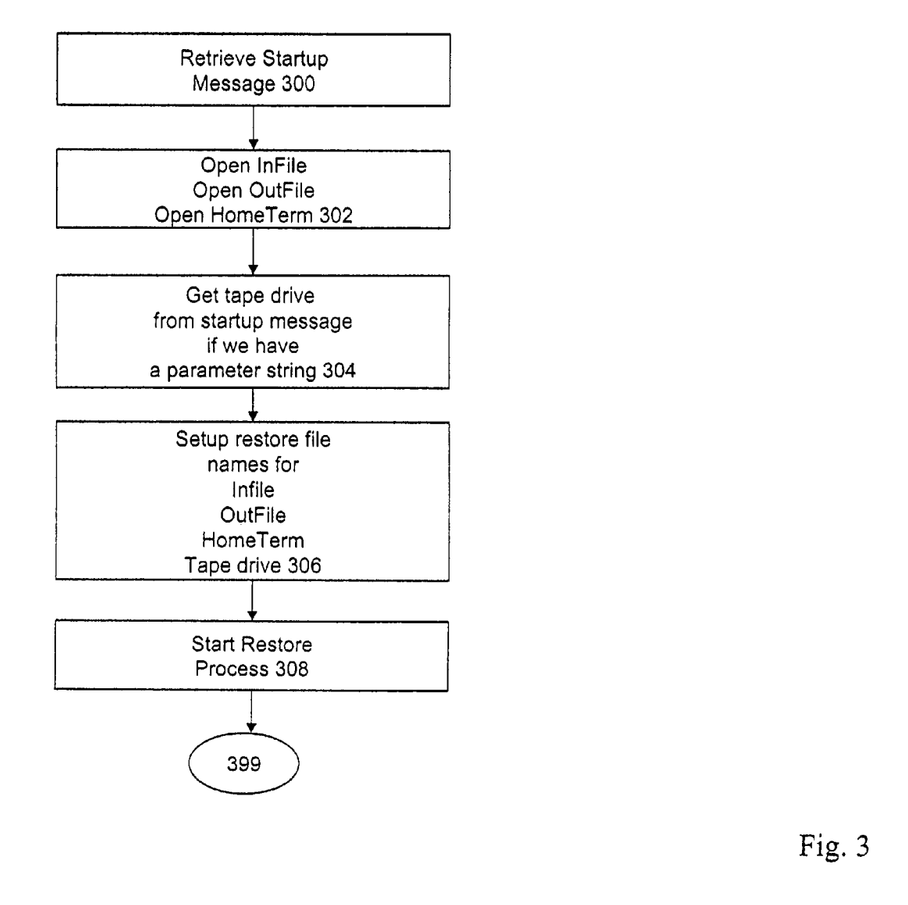
FIG. 3 is a flow diagram illustrating the flow of a Startup processing block, according to the present invention.

FIG. 3 is a flow diagram illustrating a startup process that may correspond to startup processing block 200 in FIG. 2. The process may begin in step 300 upon receiving a startup message that may include a parameter string from a client. The parameter string may come from a command file or directly from a command line and may contain a list of files or file sets to be restored and/or names of one or more tape volumes containing the files to be restored, as described above. In step 302, the process opens the InFile, OutFile, and HomeTerm files associated with the QRestore process. In step 304, the process obtains the name of the tape drive (i.e., device name). In step 306, the startup process sets up file names for InFile, OutFile, HomeTerm, and TapeDrive files that are to be used by QRestore for interacting with a Restore program. Finally, in step 308, the startup process initializes a Restore process corresponding to the Restore program. The startup process ends in step 399.

Figure 4:
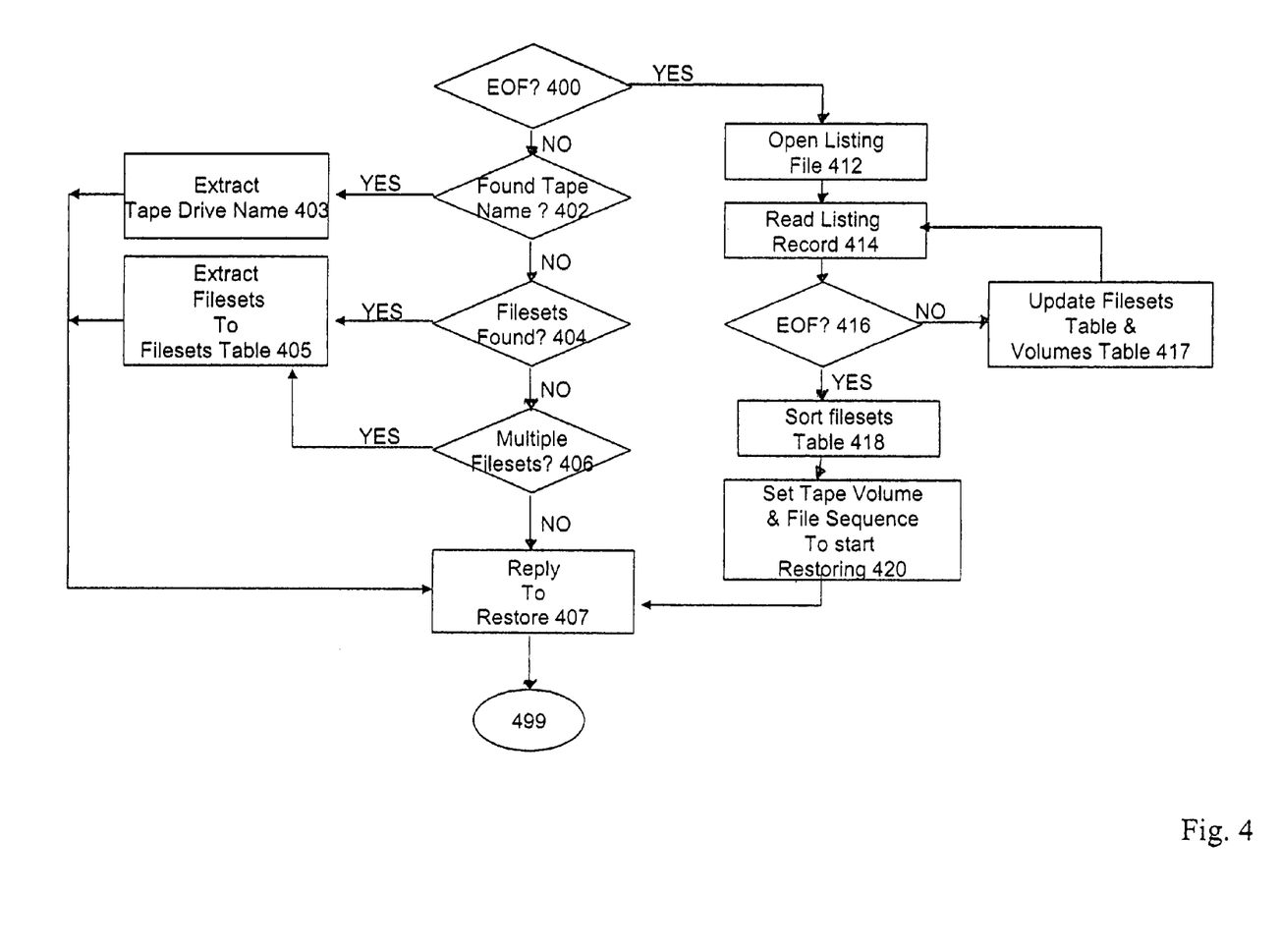
FIG. 4 is a flow diagram illustrating the flow of an InFile Message processing block, according to the present invention.

FIG. 4 is a flow diagram illustrating an InFile Message process that may correspond to InFile Message processing block 211 in FIG. 2. The process begins with decision block 400, which determines whether the InFile Message process has reached the end of file (EOF) for the current InFile messages. If not, then it proceeds to step 402, which determines whether the current data being examined in the InFile message includes a tape name. If the message does include a tape drive/name, then step 403 extracts the tape drive/name from the message, replaces it with a name that refers to QRestore, and replies to the Restore process in step 407 with the information obtained. If the current data being examined does not include a tape name, the process proceeds to step 404. Step 404 determines whether the current data being examined contains information on file sets that are to be restored. If so, then step 405 extracts the information on the file sets to a file sets table and then replies to the Restore process in step 407 with the information obtained. If the current data being examined does not include file sets information, the process proceeds to step 406. Step 406 determines whether the current data being examined contains information indicating that the remainder of the message contains information on multiple file sets. If so, then the process proceeds to step 405, described above. If the current data contains no information on a tape name, file sets, or multiple file sets, then the process replies to Restore with its results in step 407 and the InFile Message process ends with step 499.

It is desirable that the InFile Message process described above be repeated until the end of the current InFile messages are reached, whereby the process has desirably produced a file sets table containing a list of all the file sets that are to be restored. Accordingly, once the end of file is reached and the file sets table formed, step 400 proceeds to step 412, which opens a listing file. The listing file may be a catalogue containing information on all the files contained in one or more tape volumes comprising a tape set of the backup system, as described above. In one embodiment of the invention, the listing file may be obtained from media management software, such as QTOS for HP NonStop (developed by the assignees of the present invention). Regardless of how the listing file/catalogue is obtained, it is opened in step 412 and read in step 414. Step 416 determines whether the end of the catalogue file has been reached. If not, then step 417 updates the file sets table with information on the physical location (i.e., a tape volume and file sequence number) of each file in the file set(s) once information on that particular file is found in the catalogue. A volumes table for a tape volume may also be maintained that lists the volume numbers of the one or more tape volumes that contain the files to be restored.

Once the end of the catalogue file is reached in step 416, the file sets table desirably contains information on the locations of all the files that are to be restored. Accordingly, step 418 may then sort the file sets table by tape volume and then by file sequence number in order to obtain a list ordered by physical location of files that are to be restored. Once an ordered list of files that are to be restored is obtained, step 420 obtains the tape volume and file sequence of the first file on the list and replies to Restore with an end of file (EOF) message in step 407.

Figure 5:
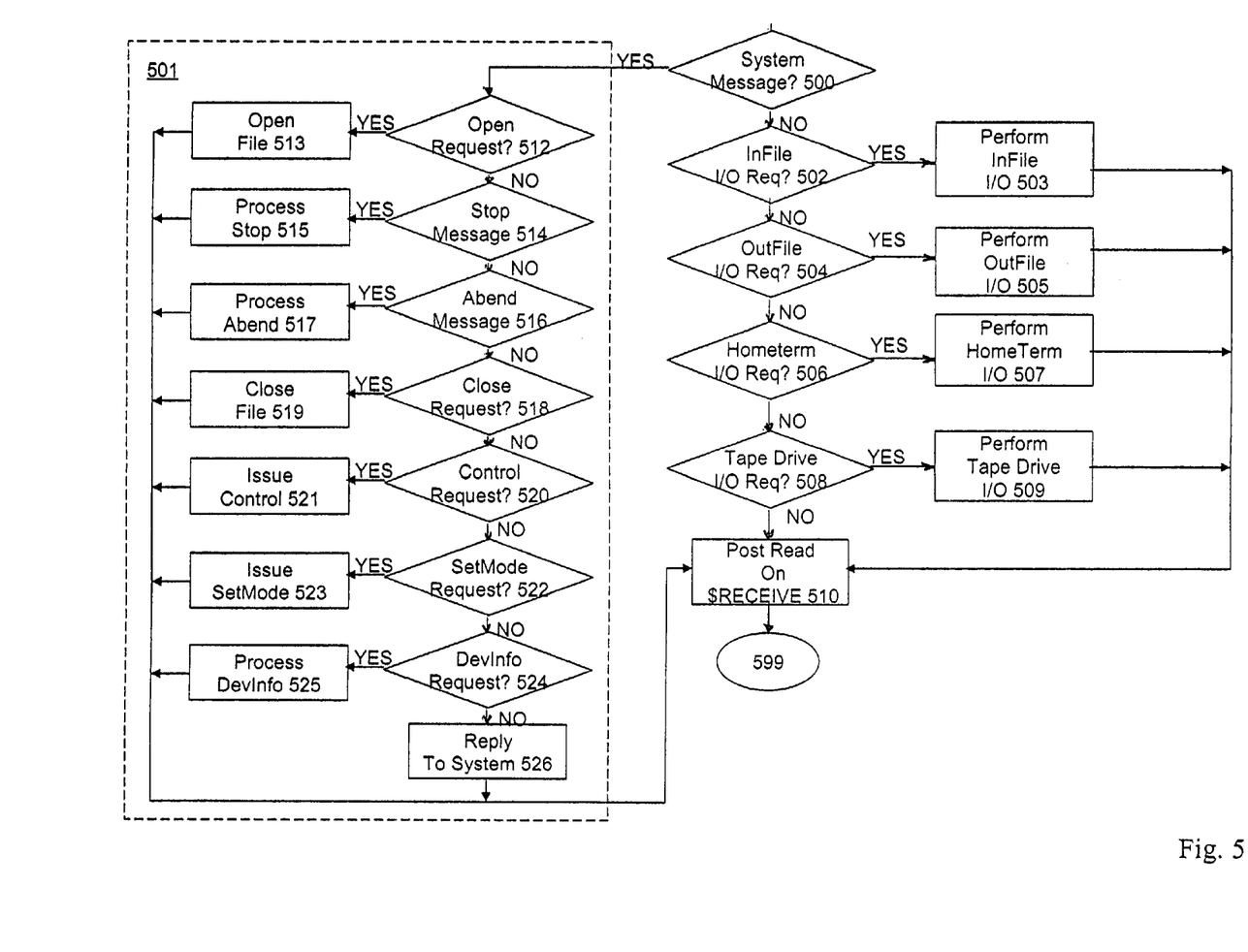
FIG. 5 is a flow diagram illustrating the flow of an Inter-Process Message processing block, according to the present invention.

FIG. 5 is a flow diagram illustrating the flow of an InterProcess Message process that may correspond to InterProcess Message processing block 207 in FIG. 2. The process begins in step 500, which determines whether the InterProcess I/O has received a system message. If so, then one or more of the system message processes are executed in block 501 (shown in phantom). These may include responding to open request 512, stop message 514, abend (abnormal end) message 516, close request 520, setmode request 522, and devinfo (device information) request 524 by running open file 513, process stop 515, process abend 517, close file 519, issue control 521, issue setmode 523, and process devinfo 525, respectively. If none of these processes is requested by the system message, step 526 replies to the system; otherwise, the required system processes are executed and the process proceeds to step 510 to post read on $RECEIVE, which tells the HP Nonstop InterProcess to wait until the next message is received and run again. The process may then end in step 599.

If a system message was not received in step 500, the process proceeds to step 502, which determines whether an InFile I/O request was sent. If so, step 503 performs the InFile I/O. If not, step 504 determines whether an OutFile I/O request was sent. If so, step 505 performs the OutFile I/O. If not, step 506 determines whether a HomeTerm I/O request was sent. If so, step 507 performs the HomeTerm I/O. If not, step 508 determines whether a Tape Drive I/O request was sent. If so, step 509 performs the Tape Drive I/O. If none of the above I/Os is requested, or if one is requested and performed, the process proceeds to post read on $RECEIVE, which tells the HP Nonstop InterProcess to wait until the next message is received and run again. The process may then end in step 599.

TABLE 2

File Sets Table generated from InFile

| Tape Vol. | Seq. No. | Filename |
|---|---|---|
| 1 | 257 | $DATA.QSATEST.* |
| 1 | 391 | $DATA1.TEST.DUMP |
| 1 | 5 | $SYSTEM.DBINFO.* |
| 2 | 1275 | $SYSTEM.ZSYS.* |

TABLE 3

QRestore InFile passed to Restore

| Tape Vol. | Seq. No. | Filename |
|---|---|---|
| 1 | 1 | $DATA.QSATEST.FILE1 |
| 1 | 2 | $DATA.QSATEST.FILE2 |
| 1 | 3 | $DATA.QSATEST.FILE3 |
| 1 | 4 | $DATA1.TEST.DUMP |
| 2 | 5 | $SYSTEM.DBINFO.FILE1 |
| 2 | 6 | $SYSTEM.DBINFO.FILE2 |
| 2 | 7 | $SYSTEM.ZSYS.FILE1 |

Table 2 is an exemplary representation of a file sets table according to the invention, and Table 3 is an exemplary representation of the appearance of the file headers passed to the Restore program. The tables are abbreviated to show only the sorted tape volume, file sequence number, and file sets/names for files that are to be restored. As described above, the Restore Accelerator program may mount tape 1, position to the first file in the list, and forward the file data to the Restore program. Because Accelerator is acting as an intermediary between the Restore program and the physical tape set, however, it is desirable that Restore be unaware that Accelerator is skipping from the sequence number 1 (at the beginning of the tape, for example) to file sequence number 257 (corresponding to the fileset $data.qsatest.*, for example), as Restore expects to search through the tape set sequentially to find the files that are to be restored. Accordingly, Accelerator may act as a virtual tape set, as described above, whereby the exemplary file headers (shown in Table 3) for Restore lists each of the files that are to be restored with modified sequence numbers. As Accelerator skips over files 1 to 256 on the physical tape set, Restore associates the delay with the virtual tape set forwarding to the next file header on the physical tape.

In one embodiment of the invention, the Restore process may be halted when the files on a single tape volume have been restored, and a new Restore process started to access the files on the next tape volume. In such an embodiment, "$system.dbinfo.*" and $system.zsys.*" from Table 2, for example, are included in the Restore InFile. Instead, they will be assigned sequence numbers starting at 1 for the first file wherein the sequence number is incremented by 1 for each subsequent file. In an alternate embodiment, the Restore process is not halted, and the new tape volume is mounted while Restore waits. In this embodiment, the tape volume changes but the file sequence numbers are maintained, where "$system.dbinfo.file1" and "$system.dbinfo.file2" from Table 3, for example, are given sequence numbers of 5 and 6, respectively, on tape number 2.

Figure 6:
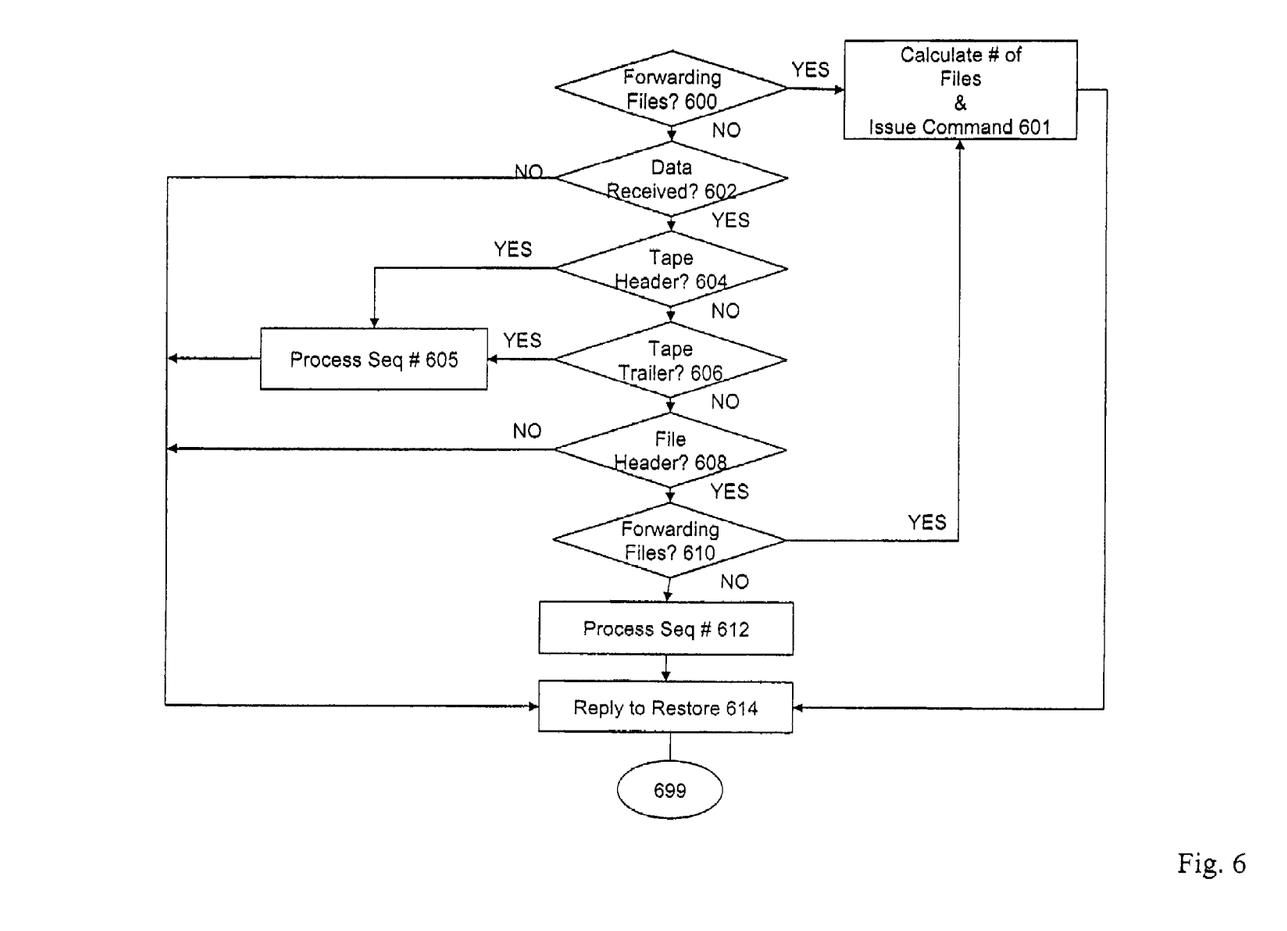
FIG. 6 is a flow diagram illustrating the flow of a Tape Message processing block, according to the present invention.

FIG. 6 is a flow diagram illustrating the flow of a Tape Message process that may correspond to Tape Message processing block 215 in FIG. 2. At this point in the file retrieval process, QRestore has caused a tape volume to be mounted and is ready to sequentially extract the files that are to be restored from that tape volume, based on the location of the files on the tape volume (i.e., QRestore extracts files that are to be restored at the start of the tape and works its way to the end of the tape). The Tape Message process begins with decision block 600, which determines whether the process is forwarding through files on the tape that are not to be restored (e.g., files 2 to 65 from Table 2).

In its first run for a particular file set and/or tape volume, the process will not start off forwarding files. Accordingly, a "no" is posted at block 600 and the process moves to step 602 in order to determine if there is data on the tape volume at the current location of the drive head. If there is no data, then the process replies to Restore in step 614. If there is data, step 604 determines whether the data comprises a tape header. If the data does not include a tape header, then step 606 determines whether the data comprises a tape trailer. If the data does not include a tape trailer, then step 608 determines whether the data comprises a file header.

The tape volume may have a tape header that includes information relevant to Restore. Among the information are a file sequence number and a checksum value. Accordingly, if a tape header is found in step 604, step 605 subsequently processes the sequence number. If the tape volume is the first tape volume mounted, the sequence number is stored as the starting sequence number and all modified sequence numbers passed to Restore are based on this number, otherwise the sequence number is altered to reflect the sequence number that Restore is expecting and the checksum value is recalculated. The process then replies to Restore in step 614.

The tape volume may have a tape trailer that includes information relevant to Restore. Among the information are a file sequence number and a checksum value. Accordingly, if a tape trailer is found in step 606, step 605 subsequently alters the sequence number to reflect the sequence that Restore is expecting and the checksum value is recalculated. The process then replies to Restore in step 614.

When the file currently being restored may be split across tape volumes, where part of the file is stored on the first tape volume, and the remainder on the second tape volume, the process will encounter a tape trailer for the current volume, modified to include the revised sequence number based on the number of file header records that were passed to Restore, rather than the actual file sequence number on the tape volume (e.g., a sequence number of "3" instead of "875", for example). A modified checksum value is recalculated and passed to Restore as part of the tape trailer. The process may then tell Restore to wait while it causes the next volume to be mounted. Once the next tape volume is ready, Restore is allowed to continue processing. It may continue to transfer the remainder of the file that is split across volumes after receiving a modified tape header for the new volume, which may include the revised file sequence number and recalculated checksum value.

If the data includes a file header, then step 608 proceeds to decision block 610. Block 610 identifies a header record of the file header and determines whether the tape volume is positioned where the files that are to be restored are stored (i.e., if the filename contained in the file header is encompassed within the current fileset). If it is determined that the tape volume has to be repositioned, step 610 proceeds to step 601 where the number of files to skip is calculated and the initial command is issued to the tape drive (e.g., based on the difference between the file sequence number in the current header record, the sequence number of the first file on the tape volume and the relative file number of the next fileset that is to be restored from that tape volume). Since the HP Nonstop systems allow a maximum of 255 files to be skipped per operation, this step may be executed numerous times, flowing from step 600 to step 601, until the tape volume is properly positioned. IF the file header corresponds to a file that is to be restored, however, step 612 generates a revised file sequence number (based on an incremented value starting with the sequence number established with the first tape volume) and recalculates the checksum value. Step 614 may then pass the header to Restore.

If the data does not include a file header in step 608, and the process was not forwarding files in block 600, then the data comprises file data corresponding to a file that is to be restored. Accordingly, the process replies to Restore in step 614 with the file data.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed is:

1. A method of retrieving a desired backup file from a tape drive to a restore process, the method comprising the steps of:
    a) indexing, by an accelerator in a table, information about locations of backup files previously stored on tape volumes of a tape set;
    b) obtaining, from a client, a name of the desired file to be retrieved from one or more respective tape volumes of the tape set;
    c) sending, to the tape drive, a read message to read the desired file, the read message indicating that the tape volumes of the tape set are to be sequentially read for retrieval of the desired file;
    d) intercepting, by the accelerator, the read message;
    e) searching, by the accelerator in the table, using the obtained name of the desired backup file, for location information regarding the desired backup file stored on the tape set, the location information indicating the one or more respective tape volumes of the tape set where the desired file is stored and a number of files on each of the one or more respective tape volumes of the tape set to be skipped before the desired file;
    f) sending, by the accelerator, one or more read commands to the tape drive to read the desired backup file from the one or more respective tape volumes using the location information;
    g) sending, to the restore process by the accelerator, simulated file header record information stored in the table and associated with file header records to be skipped before the desired file; and
    h) retrieving, by the restore process, the desired backup file after the restore process receives the simulated file header record information.

2. A method according to claim 1, wherein step e) includes the step of obtaining a file index value indicating a number of files preceding the desired backup file on the one or more respective tapes of the tape set and step f) includes the steps of:
    f1) issuing, by the accelerator, an open command to the tape drive on which a first tape of the tape set is mounted;
    f2) issuing a read command to the tape drive;
    f3) obtaining a file header record from the tape drive in response to the read command;
    f4) decrementing the file index value;
    f5) issuing a forwarding command to the tape drive; and
    f6) repeating steps f4)-f5)until the index value equals zero or the end of the mounted tape is reached;
    f7) if the end of the mounted tape is reached, mounting a next tape of the tape set and repeating steps f4)-f5) until the index value equals zero; and
    step g) includes the step of providing, to the restore process, the obtained file header record as the file header record of the desired file.

3. A method according to claim 2, wherein step h) further comprises the step of obtaining, from the tape drive, file data records corresponding to the file header record at the desired file header location and providing the file data records to the restore process.

4. A method according to claim 3, further comprising the step, prior to step g) of determining whether the file header record corresponds to the desired file.

5. The method of claim 4, wherein step g) includes the step of passing an error code to the restore process if the file header record does not correspond to the desired file.

6. A method according to claim 2, wherein step f3) further includes the steps of:
    receiving a beginning of tape record from the tape drive in response to the read command; and
    receiving one or more tape header records from the tape drive in response to the read command.

7. A method according to claim 2, further comprising the steps after step f) and before step g) of:
    adjusting, by the accelerator, a sequence number in the file header record; and
    calculating, by the accelerator for the file data record, a new checksum according to the adjusted sequence number.

8. A method according to claim 7, further comprising the steps of receiving an open tape drive command from the restore process prior to issuing the open tape command in step f1) and receiving a read tape drive command from the restore process prior to issuing the read command at step f2), the method further comprising the step of passing, by the accelerator, the beginning of tape record to the restore process after step f1) and passing, by the accelerator, the one or more tape header records to the restore process after step f2).

9. A method according to claim 8, further comprising the step of adjusting, by the accelerator, a sequence number of one or more of the beginning of tape records and the one or more tape header records before passing the adjusted sequence numbers to the restore process.

10. A method according to claim 8, further comprising, during step h), the steps of:
    h1) receiving an end of tape record from the tape drive in response to the read command;
    h2) passing the end of tape record to the restore process;
    h3) receiving one or more tape trailer records from the tape drive in response to the read command; and
    h4) passing the one or more tape trailer records to the restore process.

11. A method according to claim 10, further comprising the step of adjusting a sequence number of one or more of the end of tape record and the one or more tape trailer records before passing the end of tape record and the one or more tape trailer records to the restore process.

12. A method according to claim 1, wherein the accelerator acts as a virtual drive such that the accelerator intercepts communication between the restore process and the tape drive, the method further includes reducing, by the accelerator, an amount of data provided to the restore process by modifying information sent to the restore process regarding undesired backup files to be skipped.

13. The method according to claim 1, wherein step (h) of sending, by the accelerator, simulated file header record information includes mimicking information that would have been sent to the restore process from the tape drive if the accelerator had not intercepted the read message.

14. A method of file retrieval from a backup tape set including a plurality of tape volumes using an accelerator as an intermediate between a restore process and a tape drive, the method comprising the steps of:
 a) indexing, by the accelerator in a table, information indicating locations of backup files previously stored on the backup tape set;
 b) receiving an indication of one or more files that are to be retrieved;
 c) determining a location of each of the one or more files on the backup tape set;
 d) sending, by the restore process to the tape drive, a read message to read the one or more file from the tape set;
 e) intercepting, by the accelerator, the read message;
 f) searching, by the accelerator in the table, using obtained names of the desired files, for the location information regarding the one or more files on the backup tape set, the location information indicating, for each of the one or more files, a number of files on the backup tape set to be skipped before a respective desired file;
 g) sending, by the accelerator, one or more read commands to the tape drive to read each desired file by sequentially mounting and reading respective tapes of the tape set using the location information to skip the indicated number of files; and
 h) sending, to the restore process by the accelerator, simulated file header records stored in the table and associated with file header records to be skipped before the respective desired file; and
 i) retrieving, by the restore process, a sequence of the desired file header records interspersed with simulated file header records associated with file header records to be skipped.

15. A method according to claim 14, wherein the indication is a parameter string and step b) includes receiving the parameter string from one of a command file or a command line and parsing the parameter string to obtain a list of the one or more files that are to be retrieved.

16. A method according to claim 14, wherein step c) includes the steps of:
 c1) obtaining a list of files on the backup tape set from one of a media management product or a spooler listing;
 c2) obtaining, from the list of files, a volume number and a file sequence number on the tape volume for each of the one or more files that are to be retrieved; and
 c3) generating a sequence of the one or more files that are to be retrieved sorted by the respective volume and file sequence numbers of the files to be retrieved; wherein step (i) includes the step of retrieving the one or more files according to the sequence the one or more files.

17. A method according to claim 16, wherein steps g) and h) include:
 g1) mounting a tape in the backup tape set containing a first file in the sequence on the tape drive;
 g2) positioning the tape on the tape drive to the first file in the sequence;
 h1) forwarding, to the restore process, file data corresponding to the first file in the sequence; and
 repeating steps g2) and h1) for any remaining files in the sequence until the file data corresponding to a last file in the sequence is forwarded to the restore process.

18. A method according to claim 17, wherein step h1) adjusts a file sequence number of the first file and calculates a modified checksum of the first file prior to forwarding the file data to the restore process.

19. A method according to claim 17, wherein the step of repeating steps g2) and h1) is stopped for the one or more remaining files in the sequence if a tape trailer code is received prior to reaching the last file, the method further including the steps of:
 halting the restore process;
 starting a new restore process; and
 repeating steps g1) through h1) and the step of repeating steps g2) and h1) for at least a first remaining file of the one or more remaining files in the sequence.

20. A method according to claim 17, wherein the step of repeating steps g2) and h1) is stopped for the one or more remaining files in the sequence if a tape trailer code is received prior to reaching the last file, the method further including the steps of:
 adjusting one or more of a last file sequence number, a last filename, and a last file checksum value in the tape trailer code;
 forwarding the tape trailer code to the restore process; and
 repeating steps g1) through h1) and the step of repeating steps g2) and h1) for a next tape in the backup tape set, wherein the next tape contains at least a first remaining file of the one or more remaining files in the sequence.

21. A method according to claim 17, further including the step of receiving a file header code, wherein step (g2) skips any files that are not to be retrieved based on the file header code, and step h1) also forwards, to the restore process, an adjusted file header code having a modified file sequence number and a modified checksum.

22. A system for restoring backup data from a sequential data storage medium, the system comprising a general purpose computer and computer software for controlling the general purpose computer, the software including:
 a restore process for
  receiving requests, from a client, for retrieval of backup data from the sequential data storage medium,
  sending open and read commands to the data storage medium,
  receiving the backup data, and
  providing the backup data to the client; and
 a restore accelerator process for
  intercepting the open and read commands sent from the restore process to the data storage medium,
  gathering information in a table about locations of backup files previously stored on a tape set,
  searching in the table for location information regarding the desired backup files stored on the tape set, the location information indicating a number of files on the tape set to be skipped before each respective desired backup file,
  sending new open and read commands to the data storage medium to sequentially position the sequential data storage medium to respective locations of the backup data that are to be retrieved based on the location information in the table,
  retrieving the backup data from the data storage medium, while skipping intervening data that is not to be retrieved,
  modifying one or more file sequence numbers and checksum values of the backup data, and
  forwarding to the restore process the backup data including the modified one or more file sequence numbers, checksum values such that simulated file header records stored in the table and associated with file header records to be skipped are retrieved by the restore process in a sequence of the desired file header records interspersed with the simulated file header records associated with file header records to be skipped.

23. A method of retrieving a desired backup file from a tape drive to a restore process, the method comprising the steps of:

indexing, by an accelerator in a table, information about locations of backup files previously stored on a tape or a tape set;

sending, to the tape drive, a read message to read the desired file;

intercepting, by the accelerator, the read message;

searching, by the accelerator in the table, using the obtained name of the desired backup file, for location information regarding the desired backup file stored on the tape or tape set, the location information indicating: (1) a number of files on the tape to be skipped before the desired file or one or more respective tape volumes of the tape set where the desired files is stored and a (2) number of files on each of the one or more respective tape volumes of the tape set to be skipped before the desired file;

sending, by the accelerator, one or more read commands to the tape drive to read the desired backup file using the location information;

retrieving, by the restore process, the desired file header records and the simulated file header records stored in the table and associated with file header records to be skipped as an interspersed sequence; and altering, by the accelerator, file management information including simulated file header records to match the information about locations of the desired backup files previously stored on the tape or one or more volumes of the tape set.

* * * * *